United States Patent [19]

Takeuchi et al.

[11] Patent Number: 4,533,711
[45] Date of Patent: Aug. 6, 1985

[54] POLYBUTADIENE RUBBER COMPOSITIONS HAVING IMPROVED GREEN STRENGTH

[75] Inventors: Yasumasa Takeuchi, Yokohama; Mitsuhiko Sakakibara; Nobuo Tagata, both of Yokkaichi; Masaki Ogawa, Sayama; Yasushi Hirata, Higashimurayama; Shigeru Tomihira, Kodaira, all of Japan

[73] Assignees: Bridgestone Tire Company Limited; Japan Synthetic Rubber Co., Ltd., Japan

[21] Appl. No.: 530,169

[22] Filed: Sep. 7, 1983

[30] Foreign Application Priority Data

Sep. 7, 1982 [JP] Japan ............................... 57-154585

[51] Int. Cl.³ ............................................. C08F 36/06
[52] U.S. Cl. .............................. 526/340.4; 526/153; 526/164
[58] Field of Search ...................... 526/153, 164, 340.4

[56] References Cited

U.S. PATENT DOCUMENTS

| | | | |
|---|---|---|---|
| 4,096,322 | 6/1978 | Throckmorton | 526/340.4 |
| 4,260,707 | 4/1981 | Sylvester | 526/340.4 |
| 4,429,089 | 1/1984 | Pedretti | 526/164 |

*Primary Examiner*—Paul R. Michl
*Attorney, Agent, or Firm*—Sughrue, Mion, Zinn, Macpeak, and Seas

[57] ABSTRACT

A polybutadiene rubber composition having an improved green strength is disclosed, which comprises a polybutadiene having a content of cis-1,4 bond of at least 70%, an average chain length of 1,4-bond of 110~450 and a molecular weight distribution represented by a ratio of weight-average molecular weight to number-average molecular weight of not less than 5.0.

2 Claims, 1 Drawing Figure

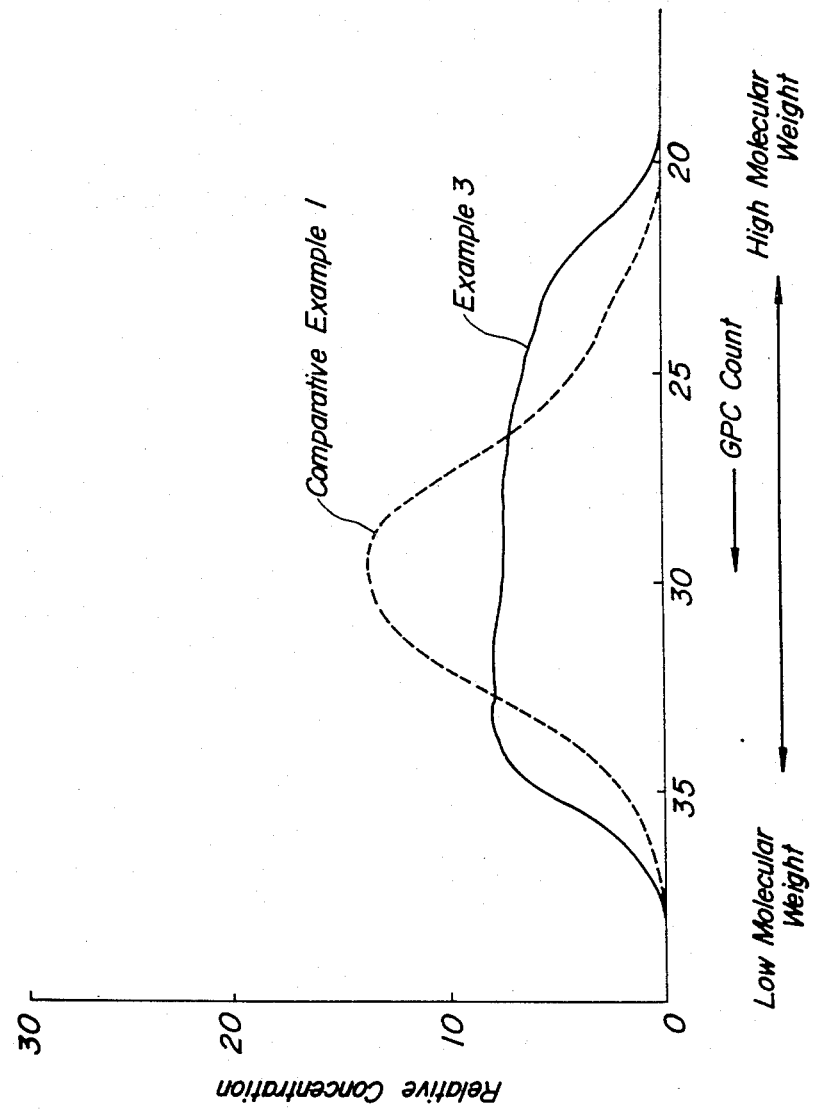

POLYBUTADIENE RUBBER COMPOSITIONS HAVING IMPROVED GREEN STRENGTH

This invention relates to novel polybutadiene rubber compositions having an improved green strength.

In order to provide synthetic rubbers having a green strength equal to that of natural rubber, there have hitherto been made various researches and developments mainly in the field of diene polymers, particularly polyisoprene, and as a result the following methods are proposed:

(1) Method of modifying rubber by the addition of a compound such as maleic acid anhydride, maleic acid amide, nitroso compound, acrylic acid or the like (for example, Japanese Patent Application Publication Nos. 45-32,707 and 47-13,062, Japanese Patent laid open Nos. 48-16,996, 49-78,790, 49-129,735 and 48-102,148);

(2) Method of precuring by irradiation of γ-ray (Japanese Patent Application Publication No. 47-11,895); and (3) Method of adding crystalline polymer (Japanese Patent Application Publication No. 44-30,990 and Japanese Patent laid open No. 48-634). In all of these methods, however, the green strength is improved, but the processability and the balance to vulcanization properties are poor, so that the above methods have not yet been put to practical use.

The inventors have made studies with respect to the molecular properties inherent to diene polymers, particularly the relation between the crystallinity and the molecular weight of the polymer in order to improve the green strength by a method entirely different from the above mentioned addition or pretreatment method, and found that the anticipated polybutadiene is obtained when the relation among content of cis-1,4 bond and average chain length of 1,4-bond resulting from the crystallinity of polybutadiene and molecular weight distribution resulting from the entanglement of molecules with each other satisfies certain conditions as mentioned later, and as a result the invention has been accomplished.

It is an object of the invention to provide polybutadiene rubber compositions having green strength and processability higher than those of natural rubber and vulcanization properties equal or superior to those of the conventionally known polybutadiene.

According to the invention, there is provided a polybutadiene rubber composition having an improved green strength, which comprises a polybutadiene having a content of cis-1,4 bond of at least 70%, an average chain length of 1,4-bond of at least 30, and a molecular weight distribution represented by a ratio of weight-average molecular weight ($\overline{M}w$) to number-average molecular weight ($\overline{M}n$) of not less than 5.0.

The polybutadiene according to the invention has a content of cis-1,4 bond of at least 70%, preferably at least 80%, more particularly 90~98% and an average chain length of 1,4-bond of 110~450, preferably 130~350. When the content of cis-1,4 bond and the average chain length of 1,4-bond are outside the above ranges, if the polybutadiene is subjected to tensile stress, the effect of crystallizing the polybutadiene by drawing orientation is not obtained and hence the green strength is not improved and the given object cannot be achieved.

Further, the molecular weight distribution $\overline{M}w/\overline{M}n$ represented by a ratio of weight-average molecular weight to number-average molecular weight is necessary to be not less than 5.0. Particularly, the molecular weight distribution is not less than 7, preferably 7~30, more particularly 7~20. When the molecular weight distribution is less than 5.0, the processability is poor and the green strength is not improved.

The polybutadienes according to the invention can favorably be produced, for example, by polymerizing butadiene in the presence of a catalyst system consisting of a combination of a compound of lanthanum series rare earth element, an organoaluminum compound and Lewis acid and/or Lewis base.

The compounds of lanthanum series rare earth element to be used in the invention include carboxylates, alkoxides, thioalkoxides, halides, amides and the like of elements having an atomic number of 57~71, particularly cerium, lanthanum, praseodymium, neodymium and gadolinium. As a source for carboxylate, alkoxide and thioalkoxide, there are mentioned, for example, octanoic acid, 2-ethyl-hexanoic acid, oleic acid, stearic acid, benzoic acid, naphthenic acid, 2-ethyl-hexylalcohol, oleyl alcohol, phenol, benzyl alcohol, thiophenol and the like. In this case, the rare earth elements may be used alone or in a combination of two or more elements.

In order to solubilize the compound of the lanthanum series rare earth element into a polymerization catalyst system, this compound may be used as a mixture or a reaction product with the Lewis base and/or Lewis acid, if necessary. Particularly, the use of the Lewis base is preferable. As the Lewis base, mention may be made of acetylacetone, tetrahydrofuran, pyridine, N,N'-dimethyl formamide, thiophene, diphenyl ether, triethylamine, organic phosphorus compound, mono- or bivalent alcohol and the like.

As the organoaluminum compound, there are used ones having a general formula of $AlR_1R_2R_3$, wherein $R_1$, $R_2$ and $R_3$ are the same or different and represent a hydrocarbon residue having a carbon number of 1-8, respectively, a typical example of which includes triethyl aluminum, triisobutyl aluminum, triisopropyl aluminum, trihexyl aluminum and the like. Among them, triethyl aluminum, triisobutyl aluminum and trihexyl aluminum are preferable.

As the Lewis acid, there are used halogenated aluminum compounds having a general formula of $AlX_nR_{3-n}$, wherein X is a halogen atom, R is a hydrocarbon residue and n is 1 to 3, a typical example of which includes diethyl aluminum chloride, sesquiethyl aluminum chloride, ethyl aluminum dichloride, aluminum trichloride, diethyl aluminum bromide, diethyl aluminum iodide and the like. Among them, diethyl aluminum chloride, sesquiethyl aluminum chloride, ethyl aluminum dichloride are preferable.

As a preferred embodiment of the invention, homogeneous rubber compositions can be produced by blending at least two polybutadienes, for example, high intrinsic viscosity polybutadiene and low intrinsic viscosity polybutadiene, which are obtained by changing the kind and amount of the catalyst, reaction conditions and the like in the polymerization of butadiene using the catalyst system as mentioned above.

Further, homogeneous rubber compositions can be produced by blending polybutadiene obtained by using the above catalyst system or a usual Ziegler catalyst with ultra-high molecular weight polybutadiene obtained by using an alkali metal catalyst. In this case, an organo lithium compound such as n-butyl lithium or the like is used as the alkali metal catalyst, and ether compound, tertiary amine or the like may be used as a cocatalyst, if necessary.

In order to obtain the homogeneous rubber composition, solutions of respective polymers in solvents may be blended with each other and then dried after the removal of the solvent, or solid polymers may be pulverized together and mixed with each other.

The polybutadiene according to the invention can also be produced by a two-stage polymerization method. In this case, the polymerization catalyst and reaction conditions are adjusted to provide a polymer having a high intrinsic viscosity at a first stage and then the polymerization reaction is adjusted to provide a polymer having a low intrinsic viscosity at a second stage. According to the two-stage polymerization method, 1,3-butadiene (hereinafter abbreviated as BD) is first polymerized in the presence of a catalyst system consisting essentially of the following ingredients (I), (II) and (III):

(I) compound of lanthanum series rare earth element having an atomic number of 57~71;

(II) organoaluminum compound represented by a general formula of $AlR_1R_2R_3$, wherein $R_1$, $R_2$ and $R_3$ are the same or different and represent a hydrocarbon residue having a carbon number of 1~8, respectively; and (III) halogenated aluminum compound represented by a general formula of $AlX_nR_{3-n}$, wherein X is a halogen atom, R is a hydrocarbon residue having a carbon number of 1~8 and n is 1 to 3.

When the degree of conversion of BD reaches at least 3%, at least one compound selected from organoaluminum hydride compounds having a general formula of $AlH_mR_{3-m}$, wherein R is a hydrocarbon residue having a carbon number of 1~8 and m is 1 or 2 and aromatic hydrocarbons having an active hydrogen is added as a modifier to complete the polymerization. In this way, the given polybutadiene can be obtained.

As the amount of the catalyst required in the polymerization of BD, the molar ratio of BD to the rare earth element is not less than $1 \times 10^4$, preferably $1.5 \times 10^4 \sim 10 \times 10^4$. The molar ratio of the ingredient (I) to the ingredient (II) is 1:2~1:100, preferably 1:5~1:70. The molar ratio of the ingredient (I) to the ingredient (III) is 1:1~1:10, preferably 1:1.5~1:5.

In addition to the ingredients (I), (II) and (III), a conjugated diene such as butadiene, isoprene, pentadiene or the like may be used as a catalyst ingredient in an amount of 0~50 moles per 1 mole of the ingredient (I), if necessary. The conjugated diene is not essential as the catalyst ingredient, but serves to more improve the catalytic activity. The addition order of the ingredients (I), (II) and (III) is not particularly restricted, but it is preferable that these ingredients are previously reacted with a small amount of the conjugated diene and then used in view of the polymerization activity.

The hydrocarbon solvent to be used includes aliphatic and alicyclic saturated hydrocarbons other than a substituted aromatic hydrocarbon having an active hydrogen, which may be used alone or in admixture. For instance, butane, pentane, hexane, heptane, cyclohexane or the like is used as the solvent.

After the starting of polymerization in the presence of the above catalyst system, when the degree of conversion of BD reaches at least 3%, preferably 5~50%, the compound selected from the organoaluminum hydride compounds having a general formula of $AlH_mR_{3-m}$ and the aromatic hydrocarbons having an active hydrogen is added to complete the polymerization reaction. In this way, the molecular weight of polymer produced at the second stage can be controlled to widen the molecular weight distribution of the final polymer product. If the degree of conversion is less than 3%, the molecular weight distribution cannot be widened.

As the modifier to be used in the second stage, the organoaluminum hydride includes, for example, diethylaluminum hydride, di-isobutylaluminum hydride and the like, while the active hydrogen containing aromatic hydrocarbon includes, for example, toluene, ethylbenzene, xylene, propylbenzene, isopropylbenzene, mesitylene, 2,4-dihydronaphthalene and the like. Among the latter, toluene, ethylbenzene and xylene are preferably used. The amount of the modifier added is optionally changed in accordance with the molecular weight distribution, Mooney viscosity and so on of the polybutadiene to be produced. For instance, in case of the alkyl aluminum hydride, a molar ratio of trialkyl aluminum to alkyl aluminum hydride is within a range of 95/5~5/95, preferably 90/10~30/70. On the other hand, in case of the active hydrogen containing aromatic hydrocarbon such as toluene, xylene or the like, the modifying effect is somewhat small, so that it is necessary to add a larger amount of the hydrocarbon. The preferred addition amount is not less than 0.1%, preferably 0.5~50% to the used solvent, and in this case it is favorable to raise the polymerization temperature. In the latter case, adiabatic polymerization is favorable.

The polymerization may be performed by any of batch process and continuous process. For instance, in case of the batch process, the modifier is added when the degree of conversion reaches the desired value, whereby polybutadiene having a wide molecular weight distribution is finally obtained. In case of the continuous process, the polymerization is usually carried out in a plurality of reaction vessels connected to each other, wherein the degree of conversion at the first stage is optionally controlled by either the size of the reaction vessel or the flow rate of the reaction solution and thereafter the modifier is added to obtain the desired polybutadiene. The polymerization temperature is usually $-30°$ C.$\sim 150°$ C., preferably $10°$ C.$\sim 100°$ C., and in this case it is not always necessary to control the temperature at constant or remove the heat of polymerization. After the polymerization reaction is stopped by the addition of a reaction terminator (e.g. water, alcohol, carboxylic acid, phenolic derivative or the like), the desolvating and drying are carried out in usual manner to obtain the object polybutadiene.

According to the invention, the molecular weight distribution can be so controlled widely that $\overline{Mw}/\overline{Mn}$ ($\overline{Mw}$: weight-average molecular weight, $\overline{Mn}$: number-average molecular weight) measured by a gel permeation chromatograph (GPC) is not less than 5, preferably not less than 7, more particularly not more than 30, further not more than 20, and a super-high molecular weight component can be included in an optional amount, whereby there are obtained polybutadienes having good processability, green strength and breaking strength after vulcanization.

In the aforementioned polymerization method, the increase of solution viscosity can be avoided and the ratio of solvent to monomer can be reduced, so that this method is advantageous in the industrialization.

From a viewpoint of the increase of green strength, it is favorable that the polybutadiene according to the invention contains not less than 1% by weight, preferably 2~30% by weight, more particularly 5~25% by weight of a component having a molecular weight of not less than 25,000,000 as polystyrene.

The average chain length of 1,4-bond defined in the invention is measured as follows. That is, the polybutadiene according to the invention is completely hydrogenated with p-toluenesulfonyl hydrazide according to a method disclosed in Makromol. Chem., 163, 1 (1973) to obtain a hydrogenation product to be tested. In this case, the completion of hydrogenation is confirmed by means of H$^1$-NMR. Then, the hydrogenated polybutadiene is measured with respect to average chain length of 1,4-bond under the following conditions using a nuclear magnetic resonance (NMR) apparatus of FX-100 Model made by Nippon Denshi Kabushiki Kaisha:

| Concentration of test sample | 300 mg/2 ml 1,2,4-trichlorobenzene with perdeuterobenzene, use of 10 mm$\phi$ probe for $^{13}$C—NMR, |
|---|---|
| Carrier frequency | 25.05 MHz, internal lock system, |
| Flip angle | 45°, |
| Pulse width | 6 $\mu$sec, |
| Acquisition time | 5.0 sec, |
| Spectrum sweep width | 2 KHz, |
| Measuring temperature | 125° C., |
| Internal reference | HMDS, |
| Number of scan | 110 × 100 to 190 × times. |

Further, average chain lengths of 1,2-bond and 1,4-bond are analyzed by the following equations according to a method disclosed in J. Polymer Sci., Polymer Physics Edition, 13, 1975 (1975):

$$\text{Average chain length of 1,2-bond} = \frac{2I_5 + 2I_6 + I_8}{I_5 + I_8}$$

$$\text{Average chain length of 1,4-bond} = \frac{8I_9 + 5I_{10} + 2I_{11}}{8I_9 + 4I_{10}}$$

wherein each of $I_5$, $I_6$, $I_8$, $I_9$, $I_{10}$ and $I_{11}$ is an intensity of peak area at each of 37.2, 34.8, 34.0, 31.0, 30.5 and 30.0 ppm. The assignment of the analytical results is shown in the following Table 1.

TABLE 1

| Equation *1 | Assignment | Chemical shift (ppm) *2 |
|---|---|---|
| $I_1 = k \sum_{r=2}^{r} (r-1)N_{01(1)r10}$ |  | 40.4 |
| $I_2 = kN_{010}$ |  | 40.3 |
| $I_3 = 2k \sum_{r=1}^{r} N_{01(1)r10}$ |  | 39.7 |
| $I_4 = kN_{0110}$ |  | 39.0 |

TABLE 1-continued

| Equation *1 | Assignment | Chemical shift (ppm) *2 |
|---|---|---|
| $I_5 = 2k \sum_{r=0}^{r} N_{01(1)r10}$ |  | 37.2 |
| $I_6 = k \sum_{r=0}^{r} rN_{01(1)r10}$ |  | 34.8 |
| $I_7 = 2k \sum_{r=0}^{r} N_{01(1)r10}$ |  | 34.5 |
| $I_8 = 2kN_{010}$ |  | 34.0 |
| $I_9 = kN_{101}$ |  | 31.0 |
| $I_{10} = 2k \sum_{s=0}^{s} N_{10(0)s01}$ |  | 30.5 |
| $I_{11} = k \sum_{s=0}^{s} (4s + 3)N_{10(0)s01}$ | 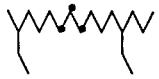 | 30.0 |
| $I_{12} = 2kN_{010}$ |  | 27.3 |
| $I_{15} = kN_{010}$ |  | 26.7 |
| $I_{16} = kN_{010}$ |  | 11.1 |

(Note)
*1: Each of $I_2, I_2, \ldots, I_{16}$ shows an intensity of peak area at respective chemical shift, and r is 1,2-bond, and s is 1,4-bond.
*2: found value of chemical shift.

Preferably, the polybutadiene according to the invention has a Mooney viscosity (ML$_{1+4}$, 100° C.) of 20~150. When the Mooney viscosity is outside this range, the processability, green strength and vulcanization properties become ill-balanced.

The polybutadiene according to the invention is used alone or blended with other rubber to produce a rubber composition. As the rubber to be blended, use may be made of diene rubbers such as natural rubber, polyisoprene rubber, polybutadiene rubber, styrene-butadiene copolymer rubber and the like. Moreover, 30~100% by weight, preferably 50~100% by weight of the polybutadiene according to the invention is blended with 0~70% by weight, preferably 0~50% by weight of the other diene rubber. If the blending ratio is outside the above range, the effect aiming at the invention is not obtained.

The thus obtained polybutadiene rubber composition according to the invention may be added with additives uaually used such as reinforcement, filler, extender oil, vulcanizing agent, vulcanization accelerator and the like to use for various applications such as tires, industrial goods and the like with the use of its properties.

The invention will now be described with reference to the accompanying drawing, wherein:

A single FIGURE is a graph showing molecular weight distributions of polybutadienes in Example 3 and Comparative Example 1 as measured by a gel permeation chromatograph.

The following examples are given in illustration of the invention and are not intended as limitations thereof.

The microstructure of polybutadiene was measured by an infrared absorption spectrum (Morero's method).

The molecular weight distribution ($\overline{M}w/\overline{M}n$) of polybutadiene and content of component having a molecular weight of not less than 25,000,000 as polystyrene were measured by means of a 200-Model GPC made by Waters Inc., wherein GPC count and calibration curve were determined by using polystyrenes having molecular weights of 8,240,000, 5,240,000, 1,800,000, 860,000, 410,000, 51,000 (made by Prescher Chemical Corporation) and 20,000,000 (made by Toyo Soda K.K.) as a standard sample. The GPC count of not more than 20 corresponds to the component having a molecular weight of not less than 25,000,000.

The intrinsic viscosity $[\eta]$ of polybutadiene was measured by means of a Ubbelohde's viscometer in toluene solution at 30° C.

The processability of unvulcanized composition was visually evaluated by roll retention on 10 inch roll at 50° C.

The green strength (GS) was measured from a stress-strain curve at a pulling rate of 500 mm/min.

The tensile strength (TB) as an indication of vulcanization properties was measured according to JIS K-6301.

EXAMPLES 1-5, COMPARATIVE EXAMPLE 1

[Polymerization of polymer A]

Into an autoclave of 10 l capacity were charged 5.6 kg of cyclohexane and 800 g of 1,3-butadiene under a nitrogen atmosphere and then the temperature was adjusted to 50° C.

Separately, a neodymium catalyst system of neodymium octanoate/acetylacetone/triethyl aluminum/diethyl aluminum chloride having predetermined molar ratios, wherein neodymium octanoate/acetylacetone is ½, triethyl aluminum/neodymium octanoate is 20 and diethyl aluminum chloride/neodymium octanoate is 2.5, was aged in the presence of a small amount of 1,3-butadiene at 50° C. for 30 minutes, which was charged together with 1,3-butadiene in a molar ratio of 1,3-butadiene to neodymium octanoate of $1.4 \times 10^4$ into the autoclave to conduct polymerization reaction. After the completion of the reaction in 6 hours, the degree of conversion was approximately 100%. Then, the polymerization reaction was stopped by adding a solution of 4.8 g of 2,4-di-tert-butyl-p-cresol in 5 ml of methanol. The thus obtained polymer had a content of cis-1,4 bond of 93% and $[\eta]$ 30° C. toluene of 11.8. [Polymerization of polymer B]

To the same catalyst system as used in the polymerization of polymer A was added 20 mol of dibutyl aluminum hydride per 1 mol of neodymium octanoate, which was used in an autoclave of 10 l capacity to conduct the same polymerization method as described on the polymer A at 50° C. for 3 hours. In this case, the degree of conversion was about 100%. Then, the reaction was stopped in the same manner as described on the polymer A. The thus obtained polymer had a content of cis-1,4 bond of 94.0% and $[\eta]$ of 3.90.

A solution of the polymer A was blended with a solution of the polymer B at a predetermined blending ratio shown in the following Table 3, and dried on a roll heated at 110° C. after the removal of solvent to obtain a polybutadiene having the properties as shown in Table 3. Further, this polybutadiene was compounded with other ingredients according to a compounding recipe as shown in the following Table 2 and then press-vulcanized at 145° C. for 30 minutes. The properties of the resulting vulcanizate were evaluated to obtain results shown in Table 3.

As apparent from Table 3, the polybutadiene rubber compositions according to the invention (Examples 1-6) are excellent in the green strength (GS) and tensile strength (TB) and good in the processability. Moreover, the measured results on molecular weight distributions of polybutadienes in Example 3 and Comparative Example 1 by GPC are shown in a single FIGURE.

TABLE 2

|  | (part by weight) |
|---|---|
| Polymer | 100 |
| Carbon black HAF | 50 |
| Zinc white | 3 |
| Stearic acid | 2 |
| Antioxidant (810NA)*1 | 1 |
| Vulcanization accelerator (NOBS)*2 | 1 |
| Sulfur | 1.5 |

*1: N—phenyl-N'—isopropyl-p-phenylenediamine
*2: N—oxydiethylene-2-benzothiazolyl sulfenamide

TABLE 3

|  | Example 1 | Example 2 | Example 3 | Example 4 | Example 5 | Comparative Example 1 |
|---|---|---|---|---|---|---|
| [Polybutadiene] | | | | | | |
| Polymer A*1 | 2 | 7.5 | 20 | 35 | 50 | — |
| Polymer B | 98 | 92.5 | 80 | 65 | 50 | — |
| JSR BR01*2 | — | — | — | — | — | 100 |
| [Properties of polybutadiene] | | | | | | |
| content of cis-1,4 bond (%) | 93.0 | 93.1 | 93.1 | 93.6 | 93.9 | 97.0 |
| average chain length of 1,4-bond | 187 | 193 | 200 | 208 | 217 | 60 |
| Mw/Mn | 6.5 | 9.2 | 11.7 | 13.2 | 15.3 | 4.0 |
| Mooney viscosity (ML$_{1+4}$, 100° C.) | 39 | 43 | 47 | 54.5 | 68 | 44 |
| $[\eta]^{30°\ C.}_{toluene}$ | 4.01 | 4.55 | 5.06 | 5.17 | 5.65 | 2.8 |
| Content of component having molecular weight of not less than 25,000,000 (wt %) | 1.0 | 2.5 | 6.6 | 9.3 | 13.0 | 0 |
| Processability | | | | | | Δ |
| GS (index)*3 | | | | | | |

TABLE 3-continued

|  | Example 1 | Example 2 | Example 3 | Example 4 | Example 5 | Comparative Example 1 |
|---|---|---|---|---|---|---|
| yield stress | 103 | 140 | 160 | 175 | 215 | 100 |
| maximum stress | 100 | 180 | 245 | 270 | 285 | 100 |
| TB (index)*4 | 100 | 110 | 110 | 120 | 125 | 100 |

*1 part by weight per 100 parts by weight of polymer of Table 1
*2 polybutadiene polymerized in the presence of a nickel catalyst system, made by Japan Synthetic Rubber Co., Ltd.
*3,4 index value on the basis that Comparative Example 1 is 100

EXAMPLE 6

[Polymerization of polymer C]

The same procedure as described in the polymerization of polymer A was repeated until the degree of conversion reached 26%, to which was immediately added the same neodymium catalyst system as used in the polymer A, except that only the molar ratio of triethyl aluminum/neodymium octanoate was changed to 50, whereby the molar ratio of 1,3-butadiene to neodymium octanoate was finally adjusted to $1 \times 10^3$. After 6 hours of the reaction, the degree of conversion was approximately 100%. Then, an antioxidant was added to the reaction system and the drying was performed on a hot roll in the same manner as described in Example 1 to obtain a desired polymer. In the thus obtained polymer, a content of cis-1,4 bond was 94%, an average chain length of 1,4-bond was 210, [$\eta$] 30° C. toluene was 5.09, $\overline{M}w/\overline{M}n$ was 12.1 and a content of component having a molecular weight of not less than 25,000,000 was 8.0%.

The properties of this polymer were evaluated in the same manner as described in Example 1. As a result, the processability was good (◎), the yield stress and maximum stress as GS (index) were 166 and 255, and TB (index) was 113.

EXAMPLES 7-10, COMPARATIVE EXAMPLES 2-5

Various rubber compositions were prepared by using the polybutadiene of Example 5 according to the compounding recipe as shown in the following Table 4 and then their properties were evaluated in the same manner as described in Example 1 to obtain results as shown in Table 4.

As apparent from Table 4, the rubber compositions obtained by blending the polybutadiene according to the invention with the other diene rubber exhibit the effect aiming at the invention.

In Table 4, GS and TB were compared between Example 7 and Comparative Example 2, between Example 8 and Comparative Example 3, between Example 9 and Comparative Example 4, and between Example 10 and Comparative Example 5, respectively.

TABLE 4

|  | Example 7 | Comparative Example 2 | Example 8 | Comparative Example 3 | Example 9 | Comparative Example 4 | Example 10 | Comparative Example 5 |
|---|---|---|---|---|---|---|---|---|
| Polybutadiene of Example 5 | 70 | — | 60 | — | 70 | — | 70 | — |
| Natural rubber (RSS #1) | 30 | 30 | — | — | — | — | — | — |
| SBR1500 | — | — | 40 | 40 | — | — | — | — |
| SBR1204*1 | — | — | — | — | 30 | 30 | — | — |
| Cariflex SSCP901*2 | — | — | — | — | — | — | 30 | 30 |
| BR01 | — | 70 | — | 60 | — | 70 | — | 70 |
| Carbon black ISAF | 50 | 50 | 50 | 50 | 50 | 50 | 50 | 50 |
| Aromatic oil | 5 | 5 | — | — | — | — | — | — |
| Antioxidant (810NA)*4 | 1 | 1 | 1 | 1 | 1 | 1 | 1 | 1 |
| Stearic acid | 2 | 2 | 2 | 2 | 2 | 2 | 2 | 2 |
| Zinc white #1 | 3 | 3 | 3 | 3 | 3 | 3 | 3 | 3 |
| Vulcanization accelerator DPG*5 | — | — | 0.3 | 0.3 | — | — | — | — |
| Vulcanization accelerator DM*6 | — | — | 0.8 | 0.8 | — | — | — | — |
| Vulcanization accelerator NOBS*7 | 1.0 | 1.0 | — | — | 1.0 | 1.0 | 1.0 | 1.0 |
| Sulfur | 1.5 | 1.5 | 1.5 | 1.5 | 1.5 | 1.5 | 1.5 | 1.5 |
| GS (index) |  |  |  |  |  |  |  |  |
| yield stress | 186 | 100 | 172 | 100 | 195 | 100 | 199 | 100 |
| maximum stress | 195 | 100 | 185 | 100 | 201 | 100 | 204 | 100 |
| Processability |  | Δ |  | Δ |  | Δ |  | Δ |
| TB (index) | 116 | 100 | 111 | 100 | 121 | 100 | 117 | 100 |

*1 solution polymerized SBR, made by Philips Petroleum Co.
*2 solution polymerized SBR, made by Shell Corp.
*3 polybutadiene made by Japan Synthetic Rubber Co., Ltd.
*4 N—phenyl-N'—isopropyl-p-phenylenediamine
*5 diphenyl guanidine
*6 dibenzothiazyl sulfide
*7 N—oxydiethylene-2-benzothiazyl sulfenamide

EXAMPLES 11-12

Into a glass autoclave of 5 l capacity purged with nitrogen were charged 2,800 g of cyclohexane as a solvent and 400 g of butadiene (BD) under nitrogen atmosphere.

Separately, neodymium octanoate (Nd) was mixed with acetylacetone, triethyl aluminum and diethyl aluminum chloride at molar ratios of triethyl aluminum/Nd=20, diethyl aluminum chloride/Nd=2.5 and acetylacetone/Nd=2 and aged at 50° C. for 30 minutes, which was charged into the autoclave at a molar ratio of BD/Nd=$1.4 \times 10^4$. After the polymerization was continued at 40° C. up to the degree of conversion of 8% (Example 11) or 21% (Example 12), isobutyl aluminum hydride was added at a molar ratio of isobutyl aluminum hydride/Nd=20 and then the polymerization was further continued for 2 hours. Thereafter, the polymerization reaction was stopped by adding 20 ml of a solution of 2.0 g of 2,6-di-tert-butyl-p-cresol in methanol. The degree of conversion was approximately 100%. The resulting polymer solution was treated in water with a steam to remove the solvent, whereby a desired polymer was recovered as a crumb slurry and dried on a roll heated at 110° C. (yield: 99%).

The reaction conditions and properties of the thus obtained polymer are shown in the following Table 5.

Moreover, this polymer was used to produce a rubber composition having the compounding recipe shown in Table 2, the properties of which after the vulcanization were evaluated to obtain results as shown in the following Table 6.

As apparent from Tables 5 and 6, the polybutadiene according to the invention gives excellent processability, green strength and breaking properties to rubber composition.

EXAMPLES 13-15

The same procedure as described in Example 11 was repeated by varying the degree of conversion at the addition point of isobutyl aluminum hydride as a modifier and/or the molar ratio of modifier/Nd to obtain polymers. The evaluation for these polymers was performed in the same manner as described in Example 11 to obtain a result as shown in Tables 5 and 6.

EXAMPLE 16

The same procedure as described in Example 11 was repeated, except that toluene was added as a modifier at an amount of 2% by weight to the solvent instead of isobutyl aluminum hydride, to obtain a polymer. The evaluation for this polymer was performed in the same manner as described in Example 11 to obtain a result as shown in Tables 5 and 6.

COMPARATIVE EXAMPLE 6

The same procedure as described in Example 11 was repeated without the addition of the modifier to obtain a polymer. In the resulting polymer, the Mooney viscosity ($ML_{1+4}$) could not be measured. Further, this polymer was poor in the processability and could not be blended with other ingredients, so that the green strength and vulcanization properties could also not be measured at all.

COMPARATIVE EXAMPLE 7

The same procedure as described in Example 11 was repeated, except that the modifier was added at the beginning of the polymerization, to obtain a polymer. The resulting polymer was very small in the molecular weight. The dispersion of carbon black was poor during the processing, and the green strength and vulcanization properties were not measured at all.

COMPARATIVE EXAMPLE 8

A rubber composition was produced by using JSR BR01 (high-cis polybutadiene rubber polymerized in the presence of a nickel catalyst system, made by Japan Synthetic Rubber Co., Ltd.) according to the compounding recipe shown in Table 2. The evaluation for this rubber composition was performed in the same manner as described in Example 11 to obtain a result as shown in Table 6.

COMPARATIVE EXAMPLE 9

A rubber composition was produced by using natural rubber (RSS #3) according to the compounding recipe shown in Table 2. The evaluation for this rubber composition was performed in the same manner as described in Example 11 to obtain a result as shown in Table 6.

TABLE 5

| | Example 11 | Example 12 | Example 13 | Example 14 | Example 15 | Example 16 |
|---|---|---|---|---|---|---|
| [Catalyst composition] | | | | | | |
| (I) neodymium (milli mole) | 0.79 | → | → | → | → | → |
| (II) triethyl aluminum (milli mole) | 15.84 | → | → | → | → | → |
| (III) diethyl aluminum chloride (milli mole) | 1.98 | → | → | → | → | → |
| (IV) isobutyl aluminum hydride (milli mole) | 15.84 | → | → | 9.95 | 7.13 | toluene |
| IV/I (molar ratio) | 20 | 20 | 20 | 13 | 9 | — |
| Degree of conversion at addition point of modifier (%) | 8 | 21 | 31 | 26 | 24 | 10 |
| [Properties of polymer] | | | | | | |
| (1) Content of component having molecular weight of not less than 25,000,000 as polystyrene (%) | 8 | 20 | 25 | 25 | 11 | |
| (2) Mooney viscosity ($ML_{1+4}$, 100° C.) | 43.0 | 47.0 | 57.5 | 68.0 | 84.0 | 60.0 |
| (3) Microstructure (%) | | | | | | |
| cis | 96.4 | 96.0 | 96.5 | 96.5 | 96.9 | 96.1 |
| vinyl | 1.3 | 1.2 | 1.0 | 1.1 | 0.9 | 1.2 |
| trans | 2.4 | 2.8 | 2.5 | 2.4 | 2.3 | 2.7 |
| (4) $M_w/M_n$ | 9.5 | 12.1 | 11.1 | 9.5 | 8.0 | 12.3 |
| (5) Average chain length of 1,4-bond | 185 | 245 | 298 | 310 | 340 | 235 |

TABLE 6

| | Example 11 | Example 12 | Example 13 | Example 14 | Example 15 | Example 16 | Comparative Example 8 | Comparative Example 9 |
|---|---|---|---|---|---|---|---|---|
| Mooney viscosity ($ML_{1+4}$) | 43.0 | 47.0 | 57.5 | 68.0 | 84.0 | 60.0 | 45.0 | 78.5 |
| Processability | | | | | | | Δ | |
| GS (index) | | | | | | | | |
| maxmum stress | | | | | | | | |
| (room temperature) | 370 | 480 | 600 | 600 | 1,000 | 650 | 100 | 570 |
| (40° C.) | 220 | 300 | 350 | 400 | 500 | 400 | 100 | 350 |
| Tensile strength (kg/cm$^2$) | 200 | 200 | 200 | 220 | 220 | 215 | 180 | 320 |

What is claimed is:

1. A polybutadiene rubber composition having an improved green strength, which comprises a polybutadiene having a content of cis-1,4 bond of at least 70%, an average chain length of 1,4-bond of 110~450, a molecular weight distribution represented by a ratio of weight-average molecular weight ($\overline{M}w$) to number-averge molecular weight ($\overline{M}n$) of not less than 5.0 and containing at least 1% by weight of a component having a molecular weight of not less than 25,000,000 as polystyrene measured by gel permeation chromatograph.

2. A polybutadiene rubber composition according to claim 1, wherein said polybutadiene is produced by polymerizing 1,3-butadiene in the presence of a catalyst system containing the following compounds (I)-(III) as an essential ingredient:

(I) a compound of a lanthanum series rare earth element having an atomic number of 57~71;

(II) an organoaluminum compound represented by a general formula of $AlR_1R_2R_3$, wherein $R_1$, $R_2$ and $R_3$ are the same or different and represent a hydrocarbon residue having a carbon number of 1~8, respectively; and (III) a halogenated aluminum compound represented by a general formula of $AlX_nR_{3-n}$, wherein X is a halogen atom, R is a hydrocarbon residue having a carbon number of 1~8 and n is 1 to 3, until a degree of conversion of 1,3-butadiene reaches at least 3%, and then adding at least one compound selected from organoaluminum hydrides represented by a general formula of $AlH_mR_{3-m}$, wherein R is a hydrocarbon residue having a carbon number of 1~8 and m is 1 or 2, and aromatic hydrocarbons containing an active hydrogen as a modifier to complete polymerization.

* * * * *